(12) United States Patent
Fenoglietto et al.

(10) Patent No.: US 10,073,440 B1
(45) Date of Patent: Sep. 11, 2018

(54) METHOD FOR THE DESIGN AND MANUFACTURE OF COMPOSITES HAVING TUNABLE PHYSICAL PROPERTIES

(71) Applicant: University of Central Florida Research Foundation, Inc., Orlando, FL (US)

(72) Inventors: Fluvio Lobo Fenoglietto, Orlando, FL (US); Jack Stubbs, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 15/895,478

(22) Filed: Feb. 13, 2018

(51) Int. Cl.
| | |
|---|---|
| *B33Y 50/02* | (2015.01) |
| *G06F 19/00* | (2018.01) |
| *G05B 19/4099* | (2006.01) |
| *B29C 64/393* | (2017.01) |

(52) U.S. Cl.
CPC ........ *G05B 19/4099* (2013.01); *B29C 64/393* (2017.08); *B33Y 50/02* (2014.12); *G05B 2219/35134* (2013.01); *G05B 2219/49007* (2013.01)

(58) Field of Classification Search
CPC ...... G05B 19/4099; G05B 2219/49007; B33Y 50/02; B29C 64/393
See application file for complete search history.

(56) References Cited

U.S. PATENT DOCUMENTS

| | | | |
|---|---|---|---|
| 8,449,959 | B2 | 5/2013 | Aksay et al. |
| 8,565,909 | B2 | 10/2013 | Bickel et al. |
| 8,916,651 | B2 | 12/2014 | Cheng et al. |
| 9,233,492 | B2 | 1/2016 | Zhang et al. |

(Continued)

OTHER PUBLICATIONS

Coffey et al., Design by Dragging: An Interface for Creative Forward and Inverse Design with Simulation Ensembles. IEEE Transactions on Visualization and Computer Graphics. 2013. vol. 19 (No. 12): 2783-2791.

(Continued)

*Primary Examiner* — Mark Connolly
(74) *Attorney, Agent, or Firm* — Paul Murty; Nicholas Pfeifer; Smith & Hopen, P.A.

(57) ABSTRACT

A method of designing and manufacturing a replica composite object based on an original object. The method identifies the structure and physical properties of an original object. Base materials, bodies, and structural templates, each of which includes associated physical properties, are utilized to generate a 3-dimensional model. The 3-dimensional model is discretized and tested to determine if the selected combination of base materials and bodies have physical properties that substantially equal the physical properties of the original object. If the physical properties do not equate, the 3-dimensional model is optimized by adjusting the combination of base materials, bodies, and structural templates. When the difference between the measured physical properties of the 3-dimensional model and the identified physical properties of the original object is less than a (Continued)

tolerance value, the method instructs an additive manufacturing system to generate a replica composite object based on the original object.

20 Claims, 14 Drawing Sheets
(11 of 14 Drawing Sheet(s) Filed in Color)

(56) References Cited

U.S. PATENT DOCUMENTS

| | | | |
|---|---|---|---|
| 9,623,608 | B2 | 4/2017 | Bickel et al. |
| 2008/0170982 | A1 | 7/2008 | Zhang et al. |
| 2010/0191360 | A1* | 7/2010 | Napadensky ............ G06T 17/00 700/98 |
| 2011/0269207 | A1* | 11/2011 | Ringeisen ............ C12N 5/0068 435/177 |
| 2016/0310259 | A1* | 10/2016 | Assmann ............ B29C 67/0088 |
| 2017/0368759 | A1* | 12/2017 | Penny ................... B33Y 50/02 |

OTHER PUBLICATIONS

Geuzaine and Remacle, Gmsh: A 3-D finite element mesh generator with built-in pre- and post-processing facilities. International Journal for Numerical Methods in Engineering. 2009. vol. 79: 1309-1331.

Schoberl, Netgen An advancing front 2D/3D-mesh generator based on abstract rules. Computing and Visualization in Science. 1997. vol. 1: 41-52.

Si, TetGen, a Delaunay-Based Quality Tetrahedral Mesh Generator. ACM Transactions on Mathematical Software. 2015. vol. 41 (No. 2): Article 11.

Maas et al., FEBio: Finite Elements for Biomechanics. Journal of Biomechanical Engineering. 2012. vol. 134: 011005-1-011005-10.

Bickel et al., Design and Fabrication of Materials with Desired Deformation Behavior. ACM Transactions on Graphics. 2010. vol. 29 (No. 4): Article 63.

Gasser et al., Hyperelastic modelling of arterial layers with distributed collagen fibre orientations. Journal of the Royal Society Interface. 2006. vol. 3: 15-35.

Deuss et al., Assembling Self-Supporting Structures. ACM Transactions on Graphics. 2014. vol. 33 (No. 6): Article 214.

Siemens, Siemens PLM Software: Fibersim: Engineering innovative, durable and lightweight composite structures (brochure). 2014: 1-19. https://www.plm.automation.siemens.com/en/products/fibersim/fibersim-documentation.shtml#lightview-close.

Vanek et al., Clever Support: Efficient Support Structure Generation for Digital Fabrication. Eurographics Symposium on Geometry Processing. 2014. vol. 33 (No. 5): 117-125.

Belter and Dollar, Strengthening of 3D Printed Fused Deposition Manufactured Parts Using the Fill Compositing Technique. Plos One. 2015. vol. 10 (No. 4): 1-19.

Quan et al., Additive manufacturing of multi-directional preforms for composites: opportunities and challenges. Materials Today. 2015. vol. 18 (No. 9): 503-512.

Massoni et al., Characterization of 3D-printed dielectric substrates with different infill for microwave applications. IEEE MTT-S International Microwave Workshop Series on Advanced Materials and Processes for RF and THz Applications (IMWS-AMP). 2016: 1-4.

Wang et al., Controlling the mechanical behavior of dual-material 3D printed meta-materials for patient-specific tissue-mimicking phantoms. Materials and Design. 2016. vol. 90: 704-712.

Wang et al., Dual-material 3D printed metamaterials with tunable mechanical properties for patient-specific tissue-mimicking phantoms. Additive Manufacturing. 2016. vol. 12: 31-37.

\* cited by examiner

METHOD FOR THE DESIGN AND MANUFACTURE OF COMPOSITES HAVING TUNABLE PHYSICAL PROPERTIES

BACKGROUND OF THE INVENTION

1. Field of the Invention

This invention relates, generally, to composites having tunable, physical properties. More specifically, it relates to the design and manufacture of a replica composite object or a replica component having tunable physical properties similar to those of an original object, such that the replica composite object exhibits similar mechanical behavior as the original object.

2. Brief Description of the Prior Art

Additive manufacturing, such as 3D printing, allows a user to create a near-replica of a target object. 3D-printed replicas provide a variety of benefits. For example, a hardware shop can replace an entire warehouse with a single 3D printer adapted to manufacture parts. Moreover, a 3D printer can be used to create replicas of components of the human anatomy. These replicas can replace existing components, such as aortic valves. Alternatively, the replicas can be used in the study and treatment of the human body. For example, understanding the physical properties of a healthy, elastic arterial wall is essential to comprehend disease states, such as aneurysms.

3D-printed replicas typically mimic the structure, or geometry, of the target object. However, replicas often fail to retain many of the physical properties of the target object. It is difficult to match the physical properties of the replica object to those of the target object, meaning that the replica object does not respond to physical stimuli in the same way as the target object responds to stimuli. Using the example discussed above, the human artery is composed of three layers having different structures. The distribution of collagen fibers within the layers determines the physical properties of each layer. A failure to replicate the physical properties of each layer diminishes the functionality of the replica, because it will not behave in a substantially identical way as the target object. In particular, the non-linear physical properties, such as elasticity and tension, have proven difficult to replicate through the use of a 3D printer.

Attempts have been made to duplicate the non-linear physical properties of a target object. One such attempt, U.S. Pat. No. 8,565,909 to Bickel et al. (hereinafter, "the '909 patent"), outlines a method of generating a replica object that is substantially similar to a target object using a series of algorithms and scripts. The '909 patent includes steps broadly directed to the determination of base material characteristics, desired characteristics of a replica object, and the ultimate output of a replica object. However, the '909 patent fails to adequately approximate the non-linear physical properties of the target object. While the '909 patent is directed to the generation of a replica object based on the qualities of a target object, the teachings of the '909 patent are limited to isotropic and transversely isotropic physical properties. The '909 patent thereby fails to achieve true anisotropy, which limits the quality of the replica object, since the properties of the replica object under the '909 patent do not vary in different directions. The '909 patent also fails to disclose methods or processes that modify the replica object beyond the selection of base material and that material's location within the object. Similarly, the '909 patent does not disclose methods for modifying boundaries or interfaces between base materials. Such modifications are useful in mitigating shear, among other failure modes common to additive manufacturing, which may be prevalent depending on the loading environment or target mechanical properties.

Accordingly, what is needed is a method of generating a replica composite object, in which individual subunits of the replica composite object are independently tunable, to more accurately represent the physical properties of an original object. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a method of designing and manufacturing a replica composite object based on an original object, the replica composite object having independently tunable subunits that include substantially identical physical properties to equivalent components of the original object, is now met by a new, useful, and nonobvious invention.

The novel method includes the steps of identifying a physical property of an original object, and determining physical properties of base materials and bodies, with the identified and determined physical properties being stored in a database. The physical properties of the original object and of the materials and bodies within the database are compared, and desired physical properties of a replica composite object are determined. The replica composite object is designed based on a structural template to match a shape of the original object, and includes one or more base materials and bodies to match the physical properties of the original object. The base materials can be independent or can be blended via material blending to mitigate shear by providing a more continuous surface on the replica composite object. A latent spring represents an example of a body. The latent spring bodies were developed as a case study for replicating the non-linear physical properties of human tissues. Bodies are designed as a starting point to replicating different physical properties, and each body includes a volume and is defined by a set of tunable boundaries. The bodies may be accompanied by instructions or algorithms to select and tune dimensional parameters to best replicate the mechanical behavior of the original object. Linear decomposition is an example of a mathematical approach used by the latent springs bodies to guide the creation of the replica composite object.

To generate the replica composite object, a 3-dimensional model is generated and divided into one or more units, which are further divided into one or more subunits. Each unit represents a part or layer of the 3-dimensional model, and each unit is independently tunable. Moreover, each unit is designed to match the physical properties of the original object. To increase the accuracy of the replica composite object, each unit is further divided into a plurality of subunits with tunable dimensions. A set of subunits include identical physical properties. An additive manufacture machine having a higher resolution is capable of generating a greater number of subunits, thereby increasing the replica composite object's accuracy.

In order to compare and tune each unit, one or more subunits are discretized into a finite number of single or multidimensional elements, each of which includes associated physical properties. Elements are subjected to virtual stimuli to measure and calculate the physical properties of the units and subunits. Elements are chosen on the basis of the mathematical method implemented to calculate the physical properties of the subunits. Mathematical methods for mechanical simulation may include the Finite Element Method (FEM), Smooth Particle Hydrodynamics (SPH) or other mesh-based or meshless methods. The calculated physical properties are determined on a unit-by-unit basis, and are compared with the identified physical properties of the original object. If the physical properties differ by more than a tolerance value, the method proceeds to optimize the 3-dimensional model by adjusting the selected base materials, bodies, and structural templates. When the difference between the physical properties of the 3-dimensional model and the original object is less than or equal to the tolerance value, the method generates the replica composite object via additive manufacturing.

An object of the invention is to design and manufacture a replica composite object or replica component part that matches an original object or part in both structure and physical properties, thereby generating a substantially identical object in both appearance and behavior to physical stimuli. The replica composite object is capable of exhibiting anisotropic properties, as well is isotropic properties. The invention accomplishes this object, in part, by analyzing, testing, and fine-tuning individual units of a 3-dimensional model based on the original object, thereby manufacturing a replica composite object that accurately represents the original object.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a method of designing and manufacturing a replica composite object based on an original object. The method begins by identifying the structure and physical properties of an original object. Base materials, bodies, and structural templates, each of which includes associated physical properties, are selected from a database and utilized to generate a 3-dimensional model. The 3-dimensional model is discretized and tested to determine if the selected combination of base materials and bodies have physical properties that substantially equal the identified physical properties of the original object. If the physical properties do not equate, the 3-dimensional model is optimized by adjusting a base material, a body, or a combination of a base material and a body. Alternatively, the structural template of the 3-dimensional model may require modification during the optimization step. When the difference between the measured physical properties of the 3-dimensional model and the identified physical properties of the original object is less than a tolerance value, the method instructs an additive manufacturing system to generate a replica composite object based on the original object.

Figure 1A:
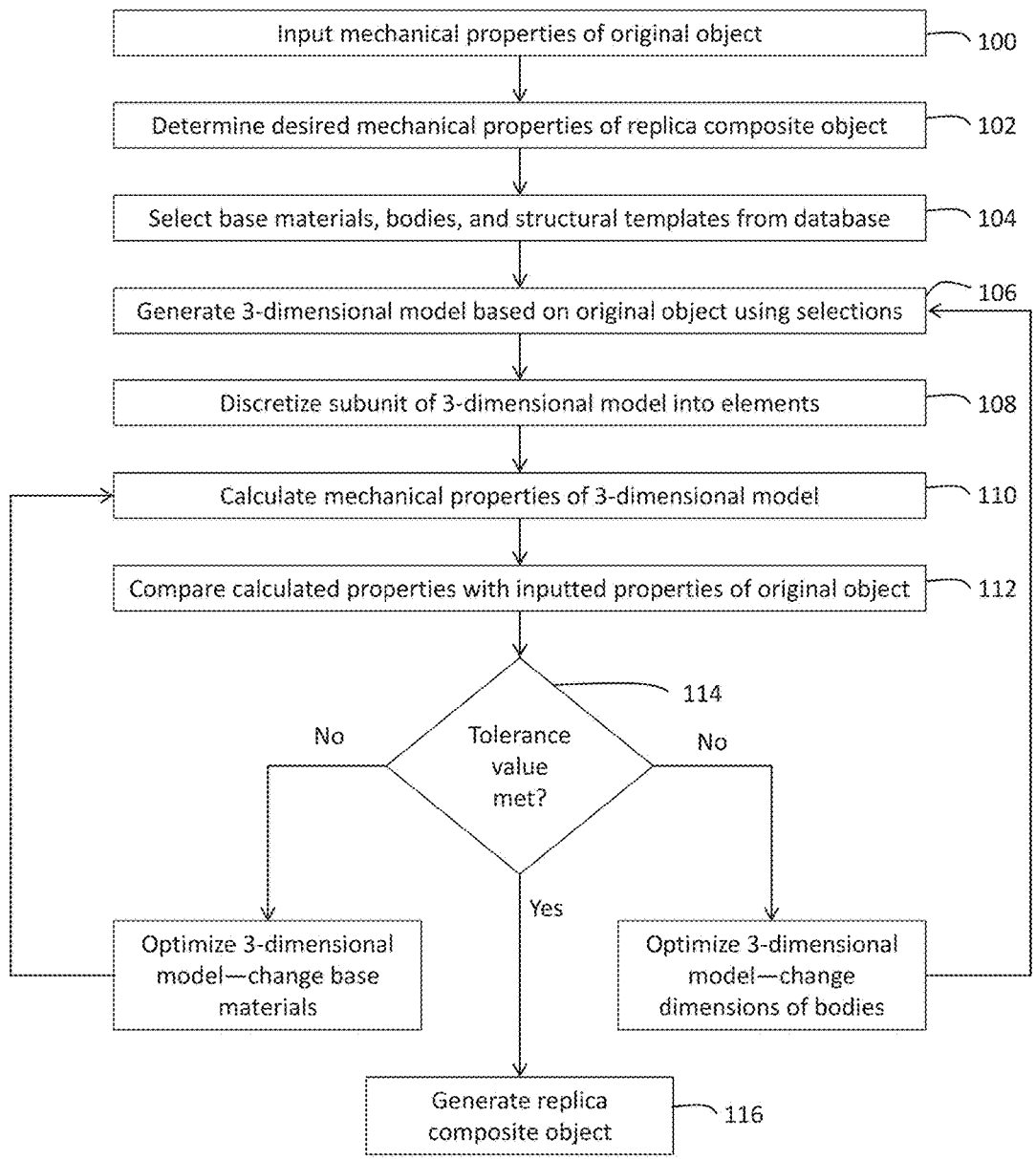
FIG. 1A is a process-flow diagram of a method of designing and manufacturing a replica composite object based on an original object.

Referring now to FIG. 1A, an exemplary process-flow diagram is provided, depicting a method of designing and manufacturing a replica composite object. The steps delineated in the exemplary process-flow diagram of FIG. 1 are merely exemplary of an order of manufacturing a replica composite object based on an original object. The steps may be carried out in another order, with or without additional steps included therein.

The method of designing and manufacturing a replica composite object begins at step 100, which includes receiving an input of one or more physical properties of an original object. The method proceeds to step 102, during which a determination script analyzes the inputted properties of the original object and selects physical properties from a database to match the inputted properties of the original object. The database includes a library of base materials and bodies, each of which includes at least one associated physical property. Next, during step 104, structural templates are selected to match the structure of the original object, and base materials and bodies are selected to match the behavior of the original object to a physical stimulus.

During step 106, a 3-dimensional model is generated including the combination of bodies and base materials selected during the determination step. The 3-dimensional model represents an initial approximation of the structure and properties of the original object. Different combinations of bodies and base materials may be used within units of the 3-dimensional model to create a more accurate approximation of the original object.

Step 108 includes discretizing at least one subunit of the 3-dimensional model into a finite number of single or multidimensional elements, each of which includes one or more associated physical properties. Each unit includes one or more subunits that are independently tunable, and each subunit of the 3-dimensional model includes elements having identical associated physical properties. Accordingly, a user can adjust the physical properties of individual subunits to improve the approximation of the original object.

Next, the method proceeds to step 110, which includes calculating the associated physical properties of the 3-dimensional model. The calculation results from performing simulations and tests on a discretized unit of the 3-dimensional model to determine the model's responses to virtual stimuli. The results of the calculation are compared with the inputted properties of the original object during step 112.

Depending on the results of the comparison of step 112, the 3-dimensional model may require adjustment to more accurately match the original object. The adjustment occurs during optimization step 114. The optimization step is a feedback loop that allows for the adjustment of either the bodies or the base materials of the 3-dimensional model. If the dimensions of the bodies of the 3-dimensional model are adjusted during the optimization step, steps 106-112 are repeated, starting with generating the modified 3-dimensional model. If only the base materials of the 3-dimensional model are adjusted, steps 110-112 are repeated without the need to generate and discretize a modified 3-dimensional model. Optimization step 114 can be performed on individual subunits of the 3-dimensional model, making the subunits independently tunable, or the entire 3-dimensional model can be optimized. Optimization step 114 and its associated feedback loop repeats until the difference between the physical properties of the 3-dimensional model and the original object is less than or equal to a tolerance value, determined by an acceptable error differential.

When optimization step 114 is complete and the 3-dimensional model substantially matches the original object, the method proceeds to step 116. Step 116 includes generating a replica composite object from the 3-dimensional model, such that the structure and physical properties of the replica composite object are substantially identical to the properties of the original object. The replica composite object may be generated via additive manufacturing or other known processes.

Figure 1B:
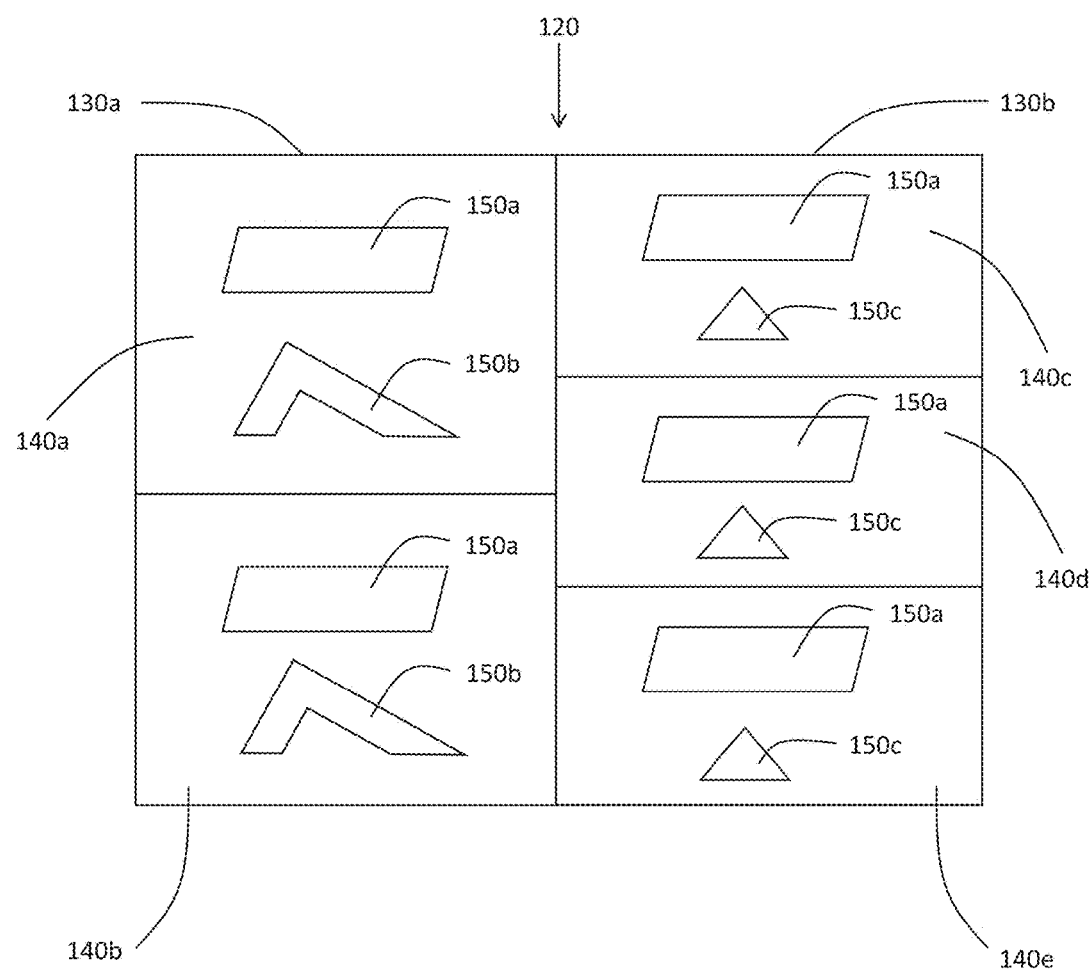
FIG. 1B depicts a replica composite object generated by the process of FIG. 1A, including a plurality of units, subunits, and bodies.

Referring now to FIG. 1B, an example of replica composite object 120 generated by the above process is shown in detail. Replica composite object 120 includes two units, denoted by 130*a* and 130*b*. Unit 130*a* is further divided into subunits 140*a* and 140*b*. Each of subunits 140*a*, 140*b* include an identical set of bodies, denoted by 150*a* and 150*b*. Similarly, unit 130*b* is further divided into subunits 140*c*, 140*d*, and 140*e*, each of which includes an identical set of bodies. The bodies in subunits 140*c-e* are denoted by reference numerals 150*a* and 150*c*. Before the overall replica composite object 120 is generated, the plurality of units 130 and the plurality of subunits 140 are tested and optimized to ensure the accuracy of replica composite object 120 as compared with an original object.

Original Object Input

The input of the method consists of the structure of the original objects and its associated physical properties. The structure of the original object refers to its form and dimensions. The original object may also be an assembly of parts, which can also be thought of a group or set of original objects. The physical properties of the original object refer to the properties that align with the original object's function. For example, the physical properties include mechanical properties, such as flexibility, elasticity, ductility, shear strength, tensile strength, and other commonly known mechanical properties. Physical properties can also include electrical properties, such as conductivity and permittivity; thermal properties, such as thermal conductivity and glass transition; optical properties, such as refraction and absorption; and other similar physical properties. Nonlinear physical properties of particular interest include hyperelasticity, incomprehensibility, and viscoelasticity. The original object input can be performed by a user, automatically read by a computer or other machine, or given to the user if the inputs are known.

Determination

The method utilizes a main algorithm to select physical properties that substantially match the inputted physical properties of the original object. The physical properties are selected from a database of properties and materials, including base materials, bodies, and structural templates. In addition, the database can include internal patterns commonly referred to as infill. The patterns are not aimed toward changing the physical properties of the end product. Instead, infill reduces build material and time. Different infill patterns and concentration may affect the physical properties of the end product, as an unintended consequence. By including infill in the database, infill-specific variants of main materials can be added to the library, thereby expanding the database and the subsequent choices for base materials during the determination step. In addition, infill allows for the integration and variety of a density material parameter for structural templates within the database.

The database is partially constructed from the mechanical characterization of base materials. Accordingly, the database contains extensive and intensive parameters, constitutive equations, and other information pertaining to the physical modeling of the base materials. Material or constitutive equations are used later in the method to simulate the mechanical behavior of base materials. The database is dynamic, including mechanical equations that are updated and used to construct and alter solid bodies, or bodies, according to the desired physical property of the body.

Rather than depending on a custom mechanical process, the method supports standard mechanical characterization protocols. Additionally, the method can be adapted for novel testing procedures. Standard mechanical characterization protocols include, but are not limited to; uniaxial tensile testing, biaxial tensile testing, compression, confined compression, torsion, etc. In general, standard mechanical protocols refers to mechanical tests that have been regulated by a governing agency, such as the American Society for Testing and Materials (ASTM). [1]

The mechanical characterization process encompasses the fitting of testing data to the database of physical properties and constitutive equations. Constitutive equations are functions that describe the physical behavior or response of an object or material to a stimulus, in this case mechanical loading. The database includes published, as well as custom, constitutive equations or models. While published models are prioritized, custom models can be generated for novel materials or composites.

3-Dimensional Model Generation

Given the inputted physical properties of the original object, the method selects base materials, bodies, and structural templates from the database to create a 3-dimensional model. The 3-dimensional model serves as an initial guess to the overall, iterative design process of a replica composite object.

In generating the 3-dimensional model, the main algorithm derives information from the inputted physical properties of the original object. The derived information guides the selection of a specific combination of base materials, bodies, and structural templates. The most basic information obtained from the inputted physical properties consists of the loading environment (or loading type) and the magnitude of such loading. From these parameters, the method can select a structural template designed for the specific loading environment, and the combination of base materials and bodies that best suit the magnitude of the loading.

After the method selects the structural template and combination of base materials and bodies, the method generates the 3-dimensional model. The 3-dimensional model consists of a series of $n_b$ bodies, encompassing $n_\Omega$ volumes and $n_\Gamma$ boundaries:

$$A = \Sigma_{h=1}^{np} p_h \quad \text{(Eq. 6.1)}$$

$$p = b_T \quad \text{(Eq. 6.2)}$$

$$b_T = \Sigma_{h=1}^{nb} b_h \quad \text{(Eq. 6.3)}$$

$$\Omega_T = \Sigma_{i=1}^{nv} \Omega_i \quad \text{(Eq. 6.4)}$$

$$\Gamma_T = \Sigma_{j=1}^{n\Gamma} \Gamma_j \quad \text{(Eq. 6.5)}$$

Each volume is described by a known volume integral, dependent on key variables expressed in preferable coordinate systems (Cartesian, Cylindrical, Spherical, etc.):

$$\Omega_i = \iiint \omega_i dV \equiv$$

$$\Omega_i = \iiint \omega_i(x,y,z) dx dy dz,$$

$$\Omega_i = \iiint \omega_i(z,r,\theta) dz dr d\theta,$$

$$\Omega_i = \iiint \omega_i(r,\theta,\phi) dr d\theta d\phi \quad \text{(Eq. 6.6)}$$

Each boundary (or interface) between bodies is also described by a volume integral aimed towards varying the contact area:

$$\Gamma_j = \iiint \gamma_j dV \equiv$$

$$\Gamma_j = \iiint \gamma_j(x,y,z) dx dy dz,$$

$$\Gamma_j = \iiint \gamma_j(z,r,\theta) dz dr d\theta,$$

$$\Gamma_j = \iiint \gamma_j(r,\theta,^{SM}) dr d\theta d\phi, \quad \text{(Eq. 6.7)}$$

As shown above, the 3-dimensional model comprises one or more units that are further divided into a plurality of subunits. The subunits can be infinitesimally small subdivisions, based on a resolution of an additive manufacturing machine. The units are repetitive and representative of the physical properties of a component of the 3-dimensional model. The number and size of subunits is determined by the limitations of the manufacturing process that occurs later in the method. For example, a machine having a higher resolution is capable of creating objects having many subunits; a machine having a lower resolution is capable of creating object having few subunits. Since subunits of a singular unit include identical sets of physical properties, the more subunits, the more accurate the printed replica composite object.

The method relies on subroutines to construct the 3-dimensional model from equations or from solid part files. The subroutines also modify the boundaries of the structural templates, base materials, and bodies, according to the original object's physical properties. The method thereby mitigates the weaknesses of the additive manufacturing processes, utilized later in the method to generate the replica composite object.

Discretization

The method next discretizes, or meshes, at least one of the entire 3-dimensional model, a unit of the 3-dimensional model, and a subunit of the unit. The result of the discretization is the generation of a finite number of single or multidimensional elements, each element having one or more associated physical properties. In addition, each element is independently tunable, meaning that an individual element or series of elements can be adjusted to modify the combination of base materials, bodies, and structural templates therein. Discretization is essential to computationally analyze the 3-dimensional model for comparison with the original object, such as by performing a Finite Element Analysis (FEA). For example, the 3-dimensional model can be discretized into a series of $n_e$ finite elements, using specific shape functions:

$$\Omega_i = \Sigma_{k=1}^{ne} X_k^{(i)} \quad \text{(Eq. 7.1)}$$

Finite elements interpolate the initial geometry in terms of the particles $X_I$ which define the initial position of the element nodes:

$$X_{k(i)} = \Sigma_{I=1}^{no} N_I(\xi_1, \xi_2, \xi_3) X_I \quad \text{(Eq. 7.2)}$$

The function $N_I(\xi_1, \xi_2, \xi_3)$ describes the shape of the element, $n_o$ the corresponding number of nodes and $\xi$ the natural coordinates of the element. Motion, displacement, velocity and virtual velocity can be discretized in the same fashion. These quantities will appear on the momentum balance equations at the core of the FEA.

The discretization process occurs in an incremental manner. The first step consists of the generation of subdivisions along two-dimensional features, such as lines or curves. The planes and/or faces outlined by the 3-dimensional model's lines or curves are discretized through standard and modified implementations of the Delaunay and frontal-Delaunay triangulations. [2]. Additional adaptive mechanisms can improve mesh quality without increasing computation time exponentially. Upon completion of the surface meshing process, the edges of the resulting tessellations are used to build tetrahedrons and, thus, produce a 3D mesh. The method employs standard algorithms for this final step, some of which can be chosen based on the resultant quality of the 3D mesh. [2, 3, 4]. The modular architecture of the method allows for the simple addition of additional meshing algorithms that may prove more robust, efficient, or distinct. (FIG. 1.1)

Simulation

After the 3-dimensional model is discretized into single or multidimensional elements, the components of the 3-dimensional model must be tested to calculate the physical properties of the 3-dimensional model. The results of the test are important, because the 3-dimensional model must substantially equal the original object to provide an accurate replica composite object based on the original object.

One way to test the 3-dimensional model is to perform a Finite Element Analysis (FEA). The FEA determines the physical response of the 3-dimensional model to an identical physical stimulus as applied to the original object. The stimulus can be mechanical, thermal, electric, chemical, or any other physical nature.

The method uses the spatial form of the virtual work equation as a starting point for the simulation:

$$\delta W = \int_{\Omega_\varphi} \sigma : \delta d\, dv - \int_{\Omega_\varphi} f \cdot \delta v\, dv - \int_{\partial \Omega_\varphi} t \cdot \delta v\, da = 0 \quad \text{(Eq. 8.1.1)}$$

In Eq. 8.1.1, σ represents the second-order Cauchy stress tensor, δd is the second-order virtual rate of deformation tensor, δv is the virtual velocity, and $\Omega^\varphi$ and $\partial\Omega^\varphi$ represent the volume and the surface in the deformed configuration. Moreover, f represents a body force component acting on each unit of deformed volume while t is the traction vector acting on each unit of the deformed surface area.

The method then performs a linearization of the virtual work equation above. In an iterative process, the deformation φ is approximated by a trial solution $\varphi_k$ using the directional derivative of the virtual work equation:

$$\delta W(\varphi_k, \delta v) + D\delta W(\varphi_k, \delta v) \cdot u = 0 \quad \text{(Eq. 8.2.1)}$$

In Eq. 8.2.1, $D\delta W(\varphi_k, \delta v) \cdot u$ is the directional derivative of the virtual work in the direction u.

The linearized solution is then discretized:

$$\delta v^T \cdot K \cdot u = -\delta v^T \cdot R \quad \text{(Eq. 8.3.1)}$$

In Eq. 8.3.1, K represents the stiffness matrix, u is the vector of nodal displacements, and R represents the residual vector. The stiffness matrix is defined by the constitutive model of choice, while the residual vector measures the difference between internal and external forces.

The virtual velocities are arbitrary, and are therefore simplified to provide a simpler solution which can be expressed in an iterative fashion:

$$K(x_k) \cdot u = -R(x_k); x_{k+1} = x_k + u \quad \text{(Eq. 8.4.1)}$$

In Eq. 8.4.1, $x_k = \varphi_k(X)$ and $x_{k+1}$ are the nodal coordinates at the respective k iteration. This iterative formulation was designed to be solved using Newton's method. In addition to full Newton-Raphson, the method also offers quasi-Newton methods like the BFGS for solving the virtual work equation. The latter implementation reduces the number of computation per solution. [5].

To match the mechanical behavior of the 3-dimensional method to that of the original object, the method utilizes several constructive equations. For example, linear, isotropic elasticity is modeling using the strain energy relation:

$$W = \frac{1}{2}\lambda(tr\epsilon)^2 + \mu\epsilon : \epsilon \quad \text{(Eq. 8.5.1)}$$

The linear elastic model of Eq. 8.5.1 applies to small strains and small rotations. An adaptation of the linear elastic model to the range of non-linear deformation comes through the implementation of the St. Venant-Kirchhoff model, which yields the relation:

$$W = \frac{1}{2}\lambda(trE)^2 + \mu E : E \quad \text{(Eq. 8.5.2)}$$

The model of Eq. 8.5.2 uses the Green-Lagrange strain tensor (E) instead of the small or infinitesimal equivalent (E). Still, the St. Venant-Kirchhoff model is only recommended for small strains.

Orthotropic Elasticity is modeled through an extension of the St. Venant-Kirchhoff equation (Eq. 8.5.2). Orthotropic materials exhibit different physical properties along orthogonal planes. This mechanical behavior is encompassed by the strain energy function:

$$W = \sum_{a=1}^{3} \mu_a A_a^0 : E^2 + \frac{1}{2}\sum_{b=1}^{3} \lambda_{ab}(A_a^0 : E)(A_b^0 : E) \quad \text{(Eq. 8.5.3)}$$

In Eq. 8.5.3, $A_a^0 = a_a^0 \otimes a_a^0$ represents the structural tensor of each orthogonal plane, $\mu_a$ equates to a shear modulus and $\nu_{ab}$ to an elastic modulus. [6]. The orthotropic elastic model must be used with caution at large strains.

Neo-Hookean Hyperelasticity is a variant of Hooke's law for the case of large deformations. The model is derived from the strain energy function:

$$W = \frac{\mu}{2}(I_1 - 3) - \mu \ln J + \frac{\lambda}{2}(\ln J)^2 \quad \text{(Eq. 8.5.4)}$$

In Eq. 8.5.4, μ and λ are the Lamé parameters, $I_1$ represents the first material invariant and J equates to the volume change of the material. Lamé parameters are material coefficients, similar and related to the more commonly known Young's modulus (E) and Poisson's ratio (ν) or the bulk modulus (K) and shear modulus (G).

Ogden Unconstrained materials are defined using the strain energy function:

$$W = \frac{1}{2}c_p(J-1)^2 + \sum_{k=1}^{N} \frac{c_k}{m_k^2}(\lambda_1^{m_k} + \lambda_2^{m_k} + \lambda_3^{m_k} - 3 - m_k \ln J) \quad \text{(Eq. 8.5.5)}$$

In Eq. 8.5.5, $\lambda_i$ represents the principal stretch ratios and $c_p$, $c_k$ and $m_k$ are material parameters. In general, material parameters are constants or coefficients calculated through the fitting of empirical data.

Other similar materials and constitutive equations used by our model include Holmes-Mow and Conewise Linear Elasticity.

The models described above are used to describe the mechanical response of compressible solids. Compressibility implies that the volume of the material changes during its deformation. Materials that exhibit an almost constant volume throughout deformation are known incompressible or nearly-incompressible materials. Our method is capable of implementing the following models: Mooney-Rivlin Hyperelasticity; Ogden Hyperelasticity; Veronda-Westmann Hyperelasticity; Arruda-Boyce Hyperelasticity; Transversely Isotropic Hyperelastic; Ellipsoidal Fiber Distribution; Fiber with Exponential Power Law; and Fung Orthotropic.

The method considers contact between boundaries both physically and virtually. Physical boundary modifications seek to ensure mechanical fidelity and mitigate manufacturing limitations. The interaction between the resultant surfaces of the replica composite object's components is modeled using contact algorithms. Enforcement of contact between volumes is achieved by adding a contact-work contribution to the virtual-work statement:

$$G_c = -\int_{\Gamma_j} t^{(j)}(x) \cdot [w^{(j)}(x) - w^{(j+1)}(\bar{y}(x))] d\Gamma \quad \text{(Eq. 8.6.1)}$$

Where $t^{(j)}$ represents the contact reaction force on body j and $w^{(j)}$ are weight functions. It is also possible to consider t as a Lagrange multiplier that enforces the contact constraint. This contact formulation can support sliding and tied interfaces. [5].

An alternative way to test the 3-dimensional model is via smooth particle hydrodynamics (SPH). SPH methods represent advances in the field of fluid simulation that do not require the meshing that FEA requires. Instead of element-based discretization, as utilized by FEA, SPH methods utilize particle-based discretization. However, a person having ordinary skill in the art would recognize that the overall method via SPH remains largely the same as via FEA.

Optimization

After discretizing the 3-dimensional model and simulating the physical responses of the 3-dimensional model to stimuli, the results of the calculations above are compared with equivalent results obtained for the original object. The error between the calculated physical responses and the desired physical responses is compared with a tolerance value, which can be selected by a user or a machine. If the error is less than or equal to the tolerance value, optimization need not take place. If the error is greater than the tolerance value, the 3-dimensional model must be optimized to more accurately match the physical properties of the original object.

The method can utilize standard optimization methods, such as the Levenberg-Marquardt and the Constrained Levenberg-Marquardt methods. The error between the observed and simulated results is minimized through an objective function:

$$f_e(c) = \sum_{i=1}^n [y_i - y(x_i; c)]^2 \quad \text{(Eq. 9.1)}$$

In Eq. 9.1, $y(x_i; c)$ represents the function that describes the 3-dimensional model. Variables y and x are to be substituted for stress and strain, for instance. The vector of constants c encompasses all the material parameters and the variables $y_i, x_i$ represent the experimental or observed data. In the method, the experimental or observed data equates to the physical properties of the original object. As any iterative method, the optimization method is tied to a tolerance value, as the error calculation may never yield an absolute zero, i.e. perfect equality.

The optimization process can modify the base materials of the 3-dimensional model to account for small differences from the tolerance value. Alternatively, the process can modify the dimensions of the bodies of the 3-dimensional model if modification of the base materials cannot yield a difference less than the tolerance value. Accordingly, the methodology features a nested optimization process, as shown in FIG. 1. Logically, any iteration on the outer optimization loop increases computational costs significantly. Consequently, an extensive and robust library of base material, bodies, and structural templates is necessary.

Given the complexity of the methodology, additional optimization functions and criteria are implemented to allow flexibility or robustness in the approximation. Two variations of the objective function (Eq. 9.1) have been developed:

$$f_e(c) = \left( \int_{x_0}^{x_n} y - \int_{x_0}^{x_n} y(x; c) \right)^2 \quad \text{(Eq. 9.2.1)}$$

$$f_e(c) = \sum_{i=1}^{n_s} \left[ \int_{t^{s(i-1)}}^{t^{s(i)}} y - \int_{t^{s(i-1)}}^{t^{s(i)}} y(x; c) \right]^2 \quad \text{(Eq. 9.2.2)}$$

Eq. 9.2.1 represents a more flexible alternative, comparing the experimental and simulated results. In Eq. 9.2.1, $x_0$ and $x_n$ extend over the entire dataset. The integral, or the area under the curve, has been associated with the strain energy in the deformation, a physical property of relevance. [6]. Eq. 92.2 can be modified to be either flexible or robust, and compares the strain energy in the deformation in segments. Eq. 9.2.2 can be reduced in increased in width (step-size) for more narrow or broad comparison.

Instruction

Once the 3-dimensional model complies with the tolerance value, the method proceeds to instruct an additive manufacturing machine to generate a replica composite object based on the original object. The replica composite object includes a combination of physical properties that substantially equates to the identified physical properties of the original object. Accordingly, the replica composite object represents a substantial match, taking into account the tolerance value, of the original object.

Case Study—Human Artery

Figure 2:
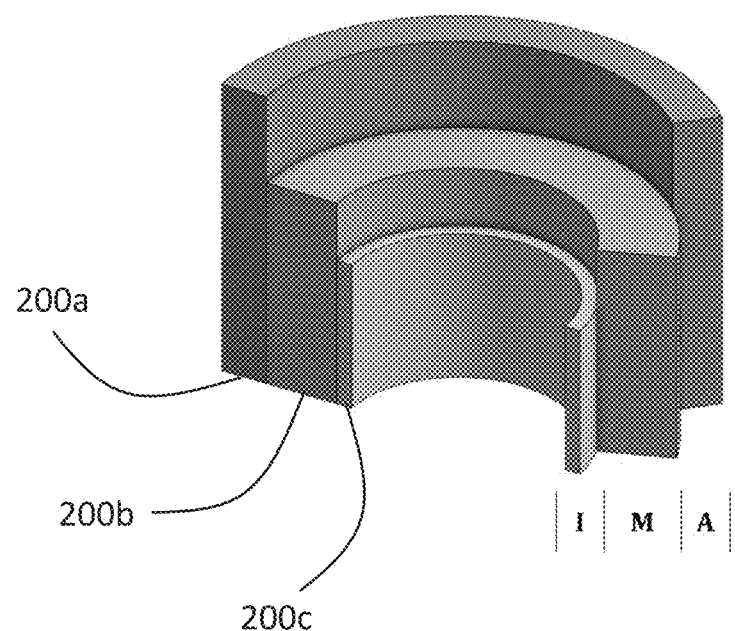
FIG. 2 depicts the units of a healthy elastic artery, including the intima (I), media (M), and adventitia (A) layers.

The presented method is aimed at solving complex mechanical loading environments, most of which are solved in nature using composite structures. One such complex mechanical loading environment is the human artery. Understanding the physical properties of a healthy, elastic arterial wall is essential to comprehend disease states like aneurysms. Histology reveals that an artery consists of three structurally-different layers, as shown in FIG. 2. The outermost layer, the adventitia, consists of collagen fibril bundles arranged helically. As a unit, the adventitia layer is represented by reference numeral 200a. The medial layer, composed of smooth muscle, exhibits a more organized, transversely isotropic distribution of collagen fibers. As a unit, the medial layer is represented by reference numeral 200b. A single, thin layer of endothelial cells, a basal membrane and a subendothelial layer encompass the innermost, intima layer of the artery. As a unit, the intima layer is represented by reference numeral 200c. [7, 8]. The particular distribution of collagen in each layer dictates the mechanical loading that each layer withstands. Biomechanics and tissue mechanics experts have characterized the physical properties of each layer, focusing on the adventitia and media layers, to understand the relationship between composition and function. The results of these experiments have led the research community to conclude that the non-linear physical properties of human tissues, and thus the layers of the artery, are dependent to the magnitude and orientation of the collagen fibers that compose them. [7, 8].

Moreover, the human artery was chosen because prior art methods of replicating non-linear behavior have proven unsuccessful. The human arterial layers exhibit non-linear behavior, as well as anisotropy. Current methods that attempt to achieve non-linearity through layering and porosity can only estimate non-linearity, and not anisotropy. [7, 8]. Through layering, the non-linear properties become isotropic. Current methods cannot freely adjust the physical properties in the isotropic orientation by changing infill. In current methods, biaxial characterization yields isotropic physical properties along the testing plane. However, in the method described herein, materials are fabricated to have orientation-dependent mechanical behavior true anisotropy.

Figure 3:
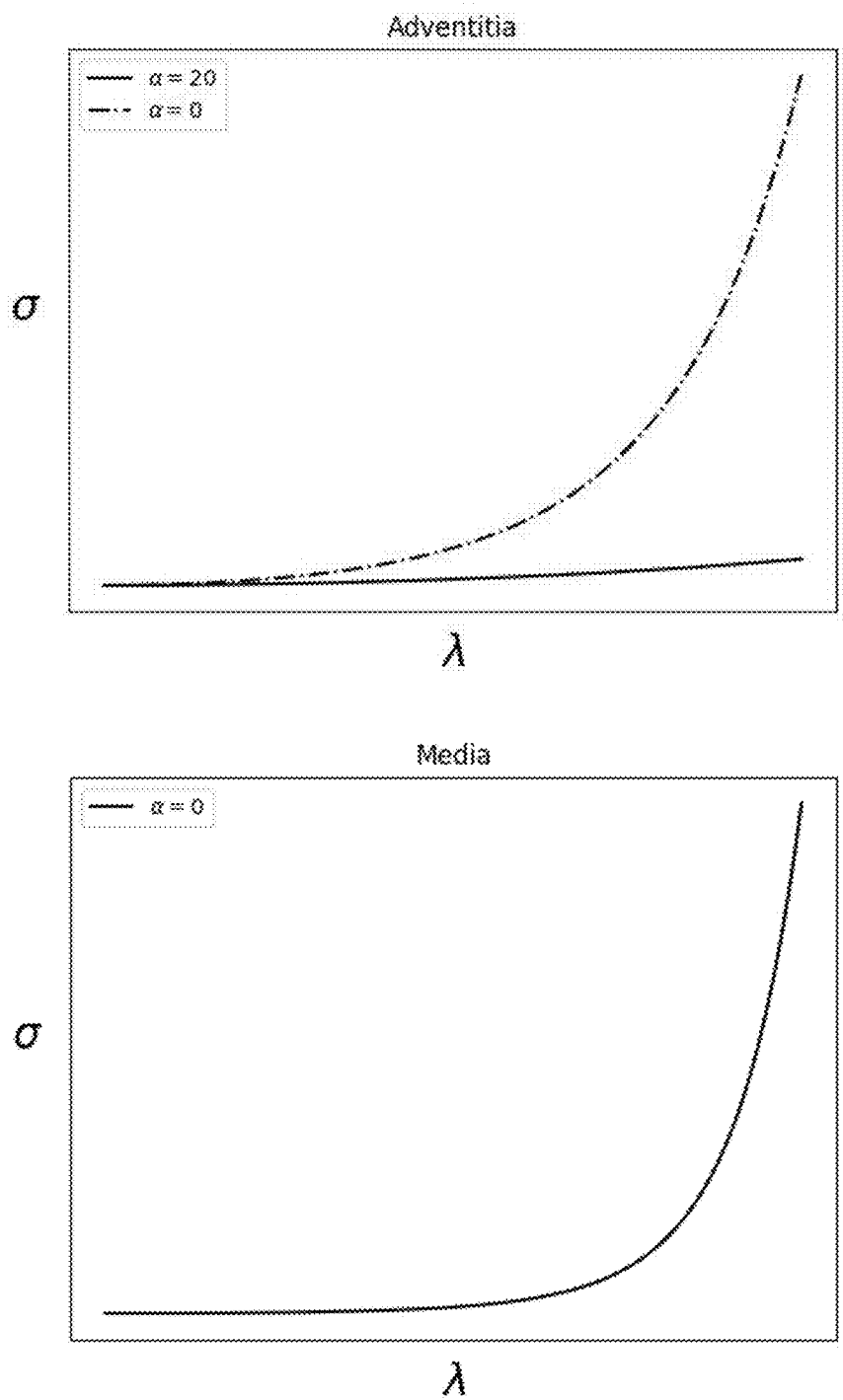
FIG. 3 depicts a series of graphs depicting the physical properties of the adventitia and media units of the human artery.

As depicted in FIG. 3, the method identifies an assembly including each layer of the human artery, and each layer's corresponding physical properties. Most of the mechanical load of the artery is borne by the adventitia and media layers, which represent the primary focus of the identification. The adventitia and media layers are characterized through the dissection and testing of each layer using a biaxial planar mechanical system.

Given the physical properties of the adventitia and media layers, the method accesses databases of base materials, bodies, and structural templates, to determine a selection to match the physical properties of the human artery. In the human artery, the adventitia and media layers exhibit a non-linear exponential mechanical response to tension, which can be characterized as strain-stiffening [7]. The method approximates strain-stiffening through the selection of structural templates that include the sequential engagement of different materials (Figure A.4). The initial approximation of the structural template is dynamic and can be slightly modified to better represent the structure of the human artery. Base materials and bodies are then selected to achieve the same approximation as the structural template.

Within the context of the human artery, the strain-stiffening structural template was designed to use linear decomposition as means of approximating the inputted non-linear mechanical response of the human artery. The number of linear models use to approximate the input behavior correlates to the number of structural templates (Figure A.4). Each linear model is also associated with a latency or reaction delay (Figure A.4), sometimes refer to as slack strain. [7]. Additional modifications to the models relate to the information gathered from the inputted mechanical response. For instance, the differences in fiber orientation between the adventitia and media layers may factor into the linear models.

Figure 4:
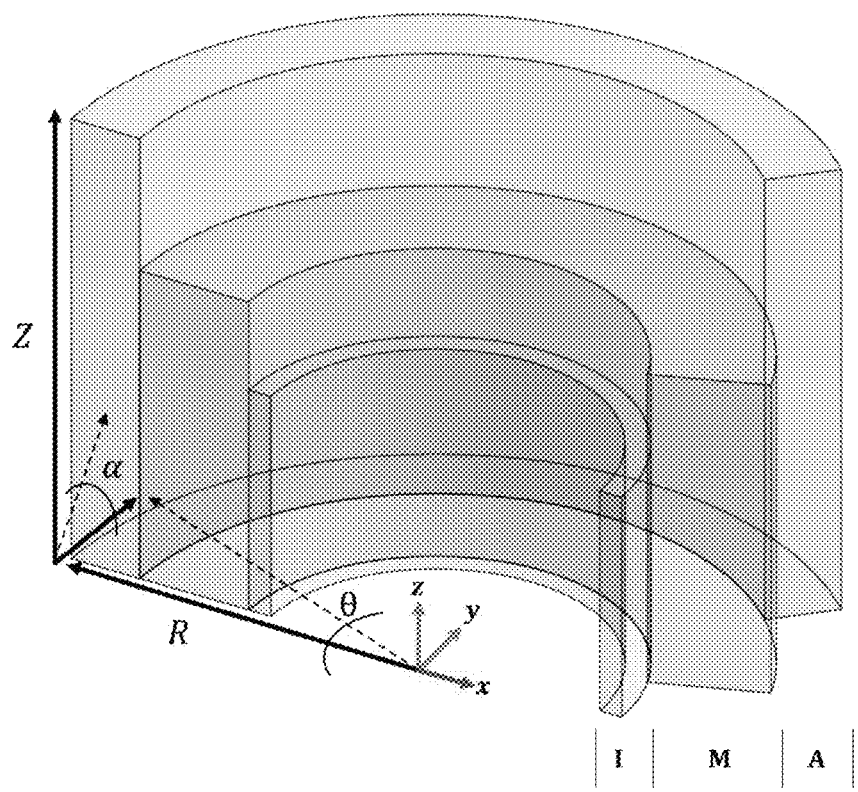
FIG. 4 is a 3-dimensional model of a human artery based on the healthy elastic artery of FIG. 2.
Figure 5:
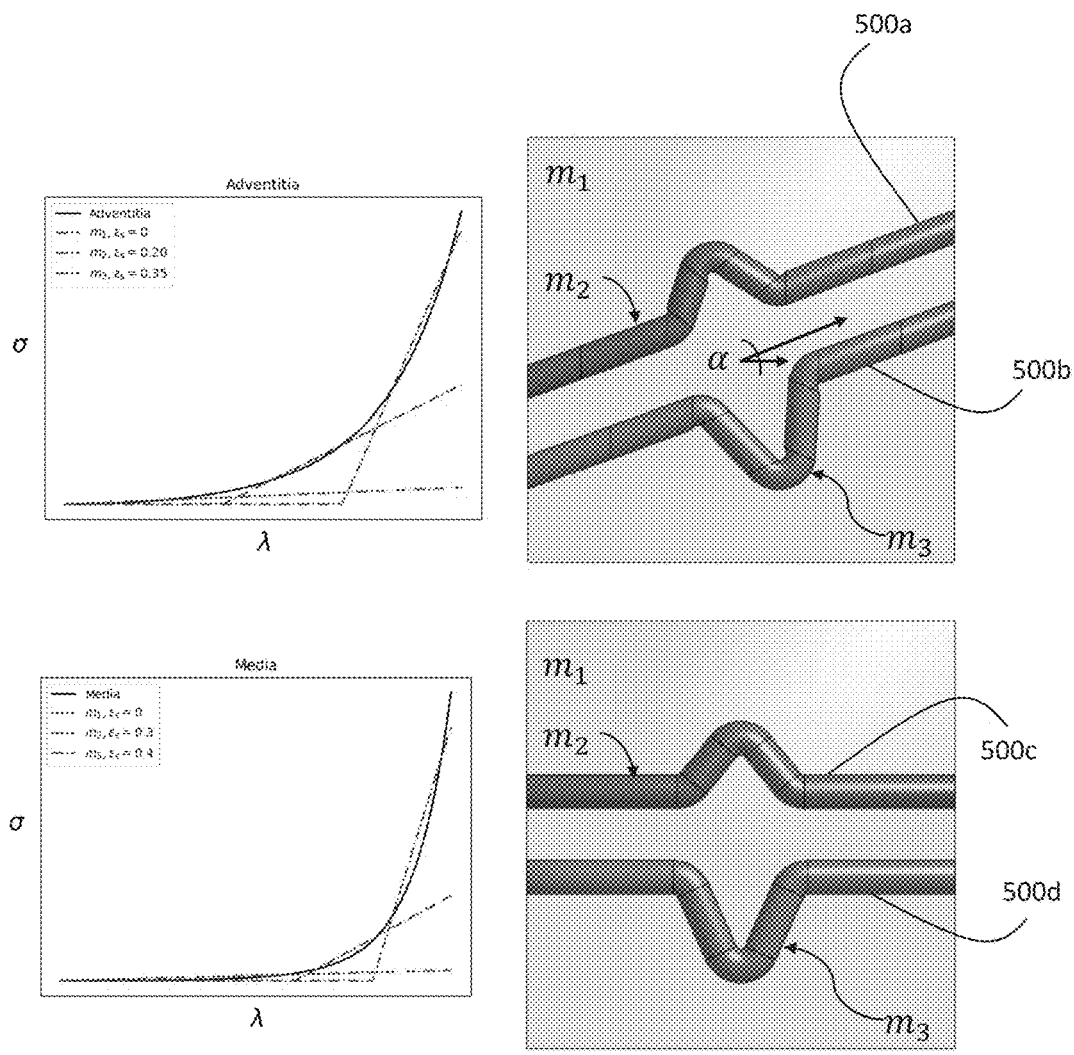
FIG. 5 is an initial approximation of inputted physical properties of the human artery through linear decomposition.
Figure 6:
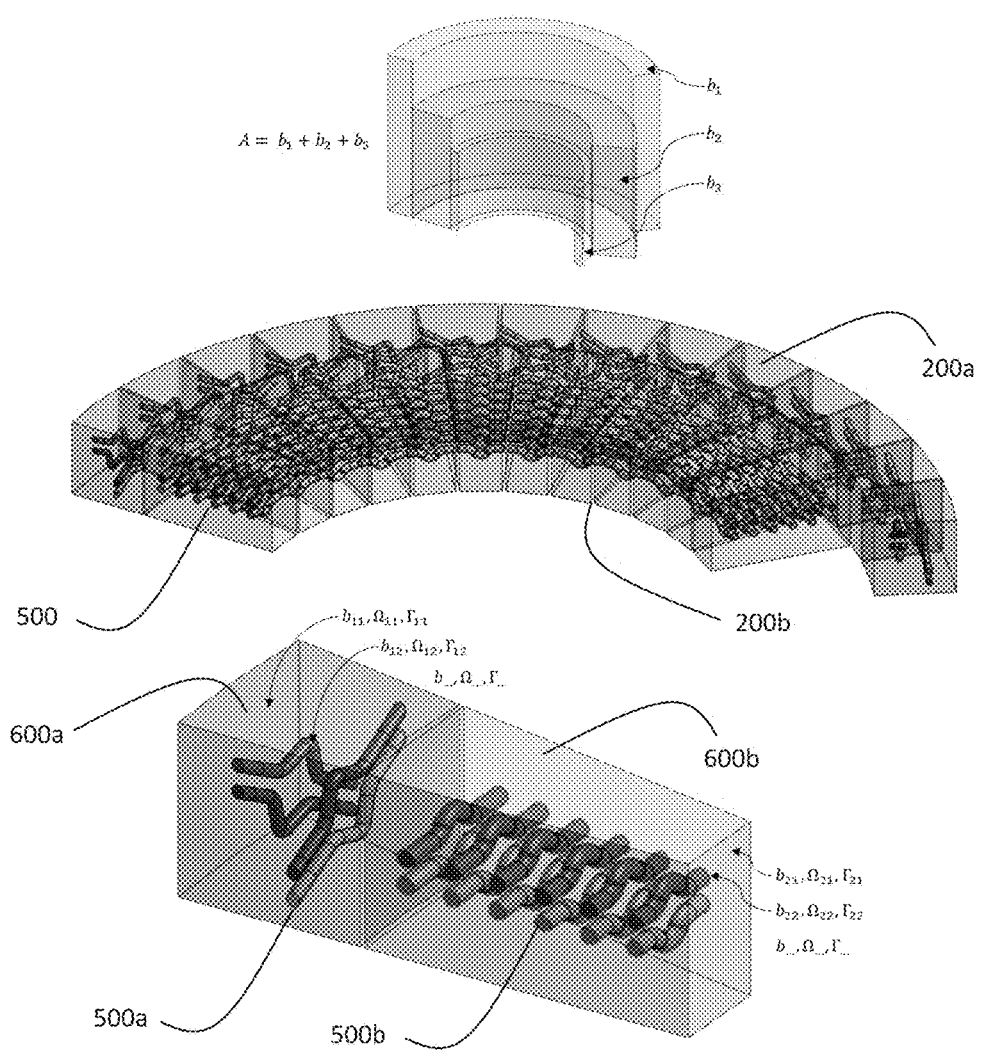
FIG. 6 is a 3-dimensional model of the adventitia and media units of the human artery.

As depicted in FIGS. 4-6, the method then generates a 3-dimensional model of the human artery based on the selected base materials, bodies, and structural templates from the previous step. The initial 3-dimensional model represents an initial guess designed to match the structure and physical properties of the 3-dimensional model to the respective characteristics of the dissected human artery. The 3-dimensional model includes an assembly determined by Eq. 6.1; parts determined by Eq. 6.2; and bodies determined by. Eq. 6.3. Each part or body includes an associated volume and set of boundaries, determined by Eq. 6.4-6.6. The bodies in FIGS. 5-6 are latent springs, represented by reference numerals 500a, 500b, 500c, and 500d. Boundaries can be shared between neighboring bodies, making them contact interfaces. Accordingly, the 3-dimensional model consists of an array of bodies, encompassing specific volumes and defined by boundaries. The boundaries of the 3-dimensional model can be modified to ensure mechanical fidelity and to mitigate manufacturing limitations. In addition, the bodies are housed within subunits 600a and 600b of units 200a and 200b, respectively.

Figure 7:
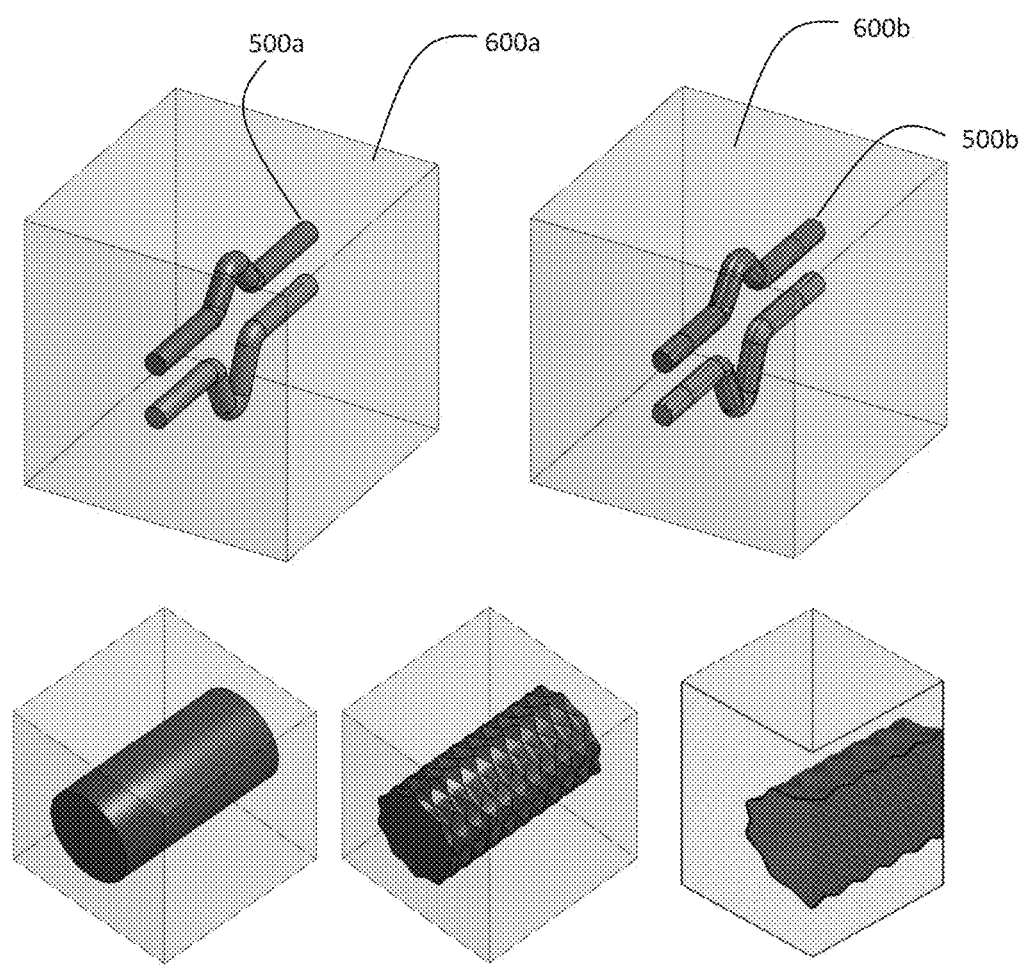
FIG. 7 depicts boundary modification of the 3-dimensional model.
Figure 8:
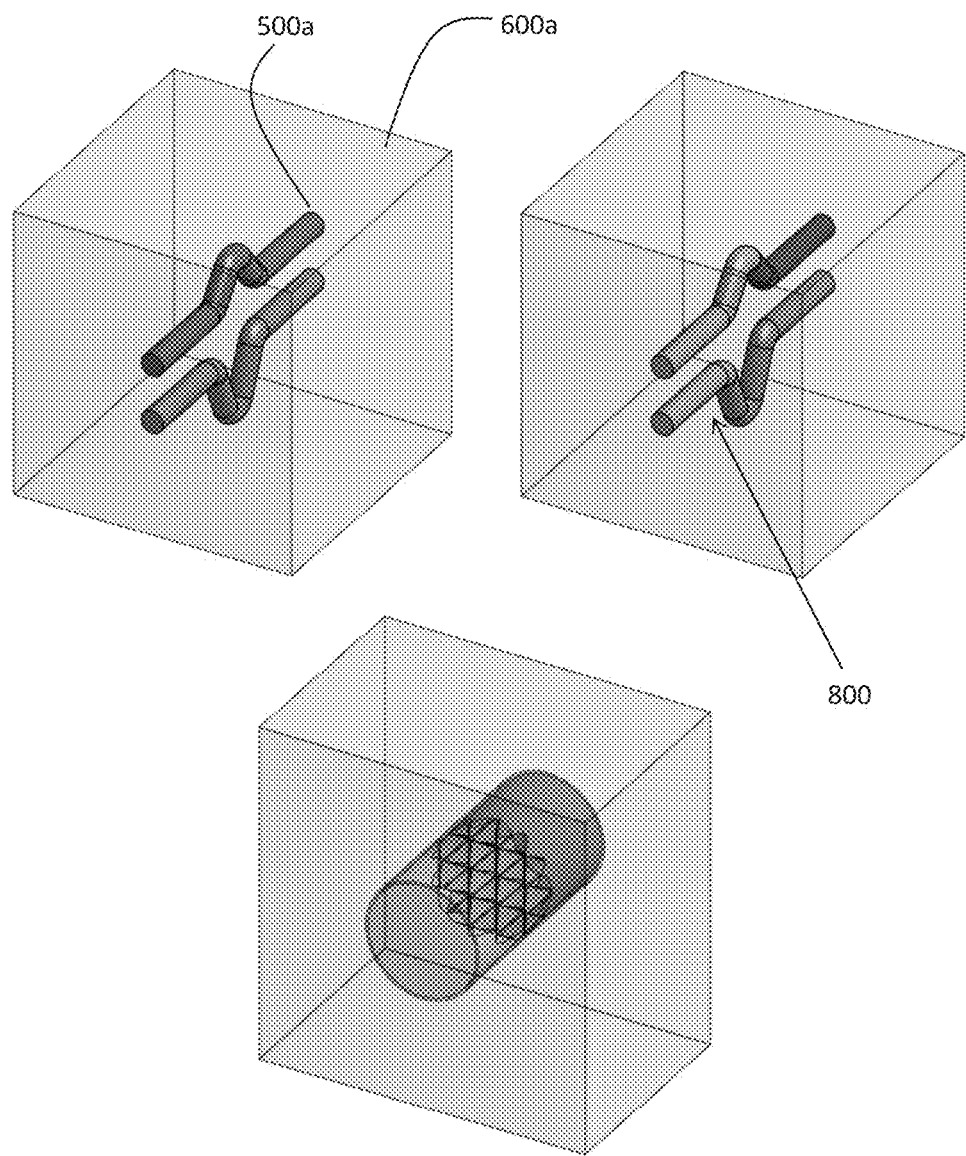
FIG. 8 depicts material blending of the 3-dimensional model.

As shown in FIG. 7, the boundaries may be modified to increase the effective surface area of contact between neighboring bodies, thereby mitigating shear of the replica object that is generated by the method. In addition, as shown in FIG. 8, the 3-dimensional model may be divided into a greater number of bodies that are in contact, allowing for material blending. Material blending enhances the contact between the bodies by, for example, combining two or more materials to provide a gradual transition between materials within an object, thereby mitigating shear. An example of a body exhibiting material blending is denoted by reference numeral 800 in FIG. 8.

Figure 9:
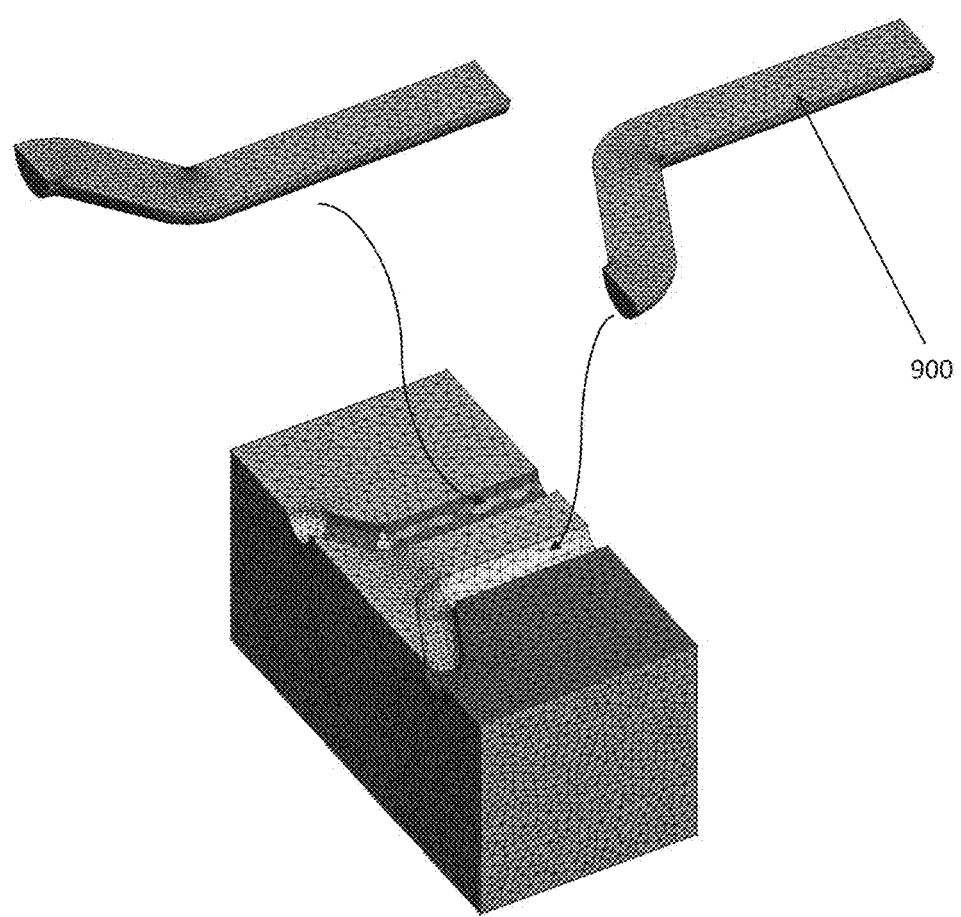
FIG. 9 is a representation of discretized finite elements of the 3-dimensional model.
Figure 10:
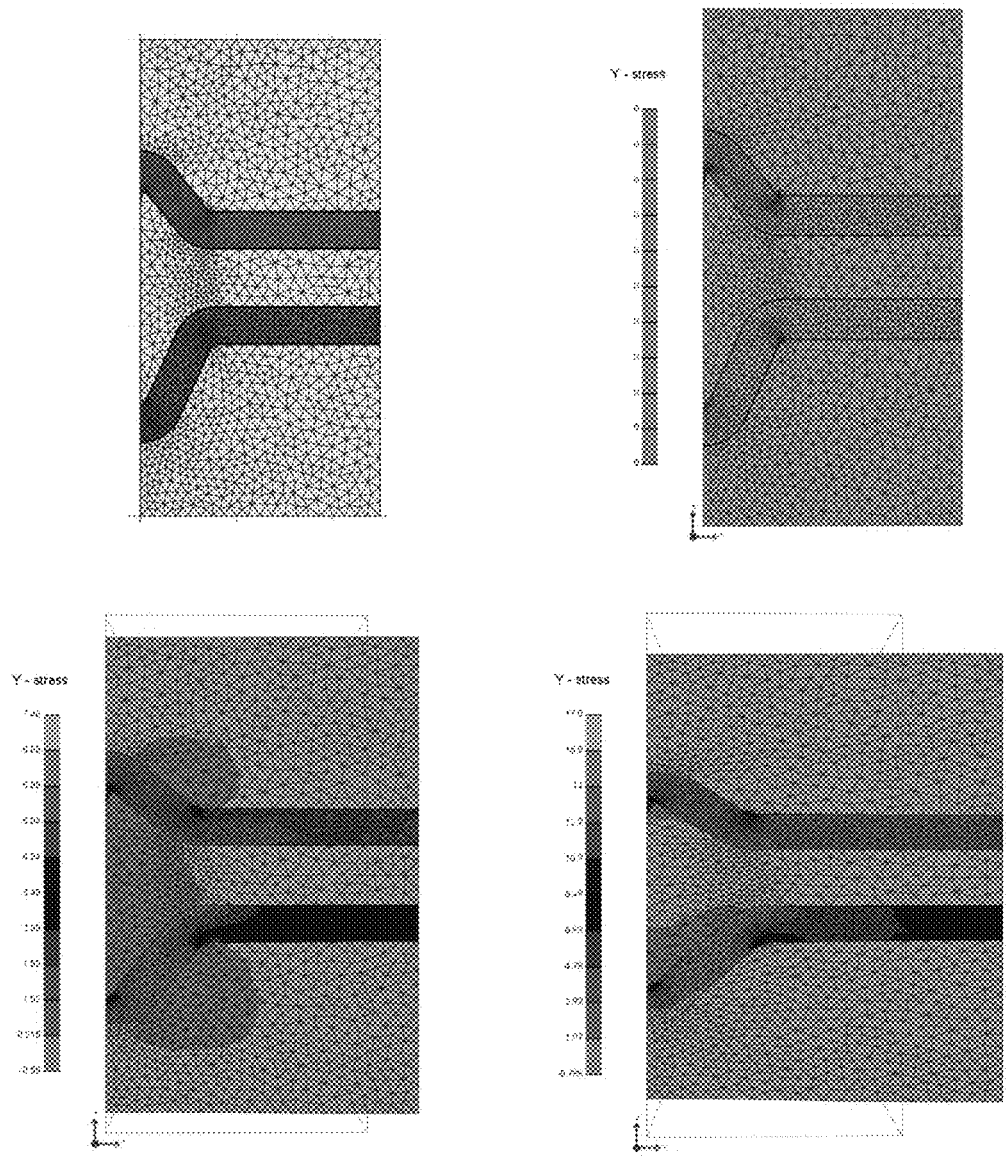
FIG. 10 depicts a Finite Element Analysis of the finite elements of FIG. 9.

The 3-dimensional model of the human artery is then discretized, body-by-body, via meshing algorithms. The discretized model is depicted in FIG. 9. The result of the discretization is the generation of a finite number of single or multidimensional elements, generally denoted by reference numeral 900. The discretized model undergoes simulation to calculate the responses of the model to physical stimuli. The results are compared with corresponding physical responses of the human artery, such as via Finite Element Analysis, as depicted in FIG. 10.

Figure 11:
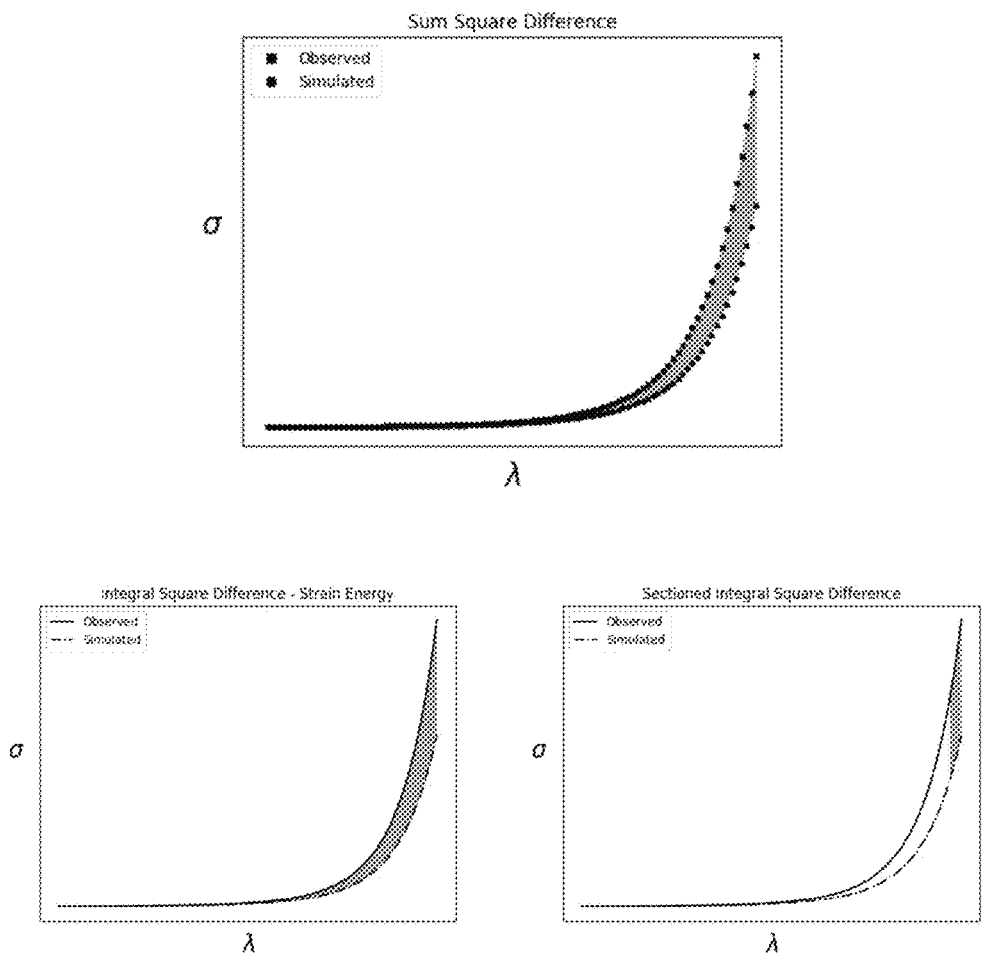
FIG. 11 is a series of graphs depicting the difference between the selected physical properties of the 3-dimensional model and the identified physical properties of the original object.
Figure 12:
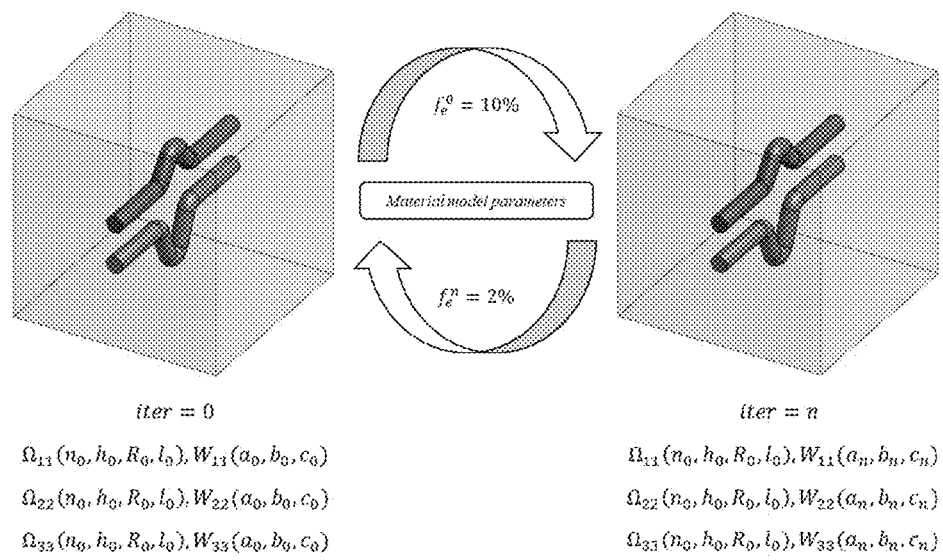
FIG. 12 depicts the optimization of the 3-dimensional model via adjustment of the selected base materials.
Figure 13:
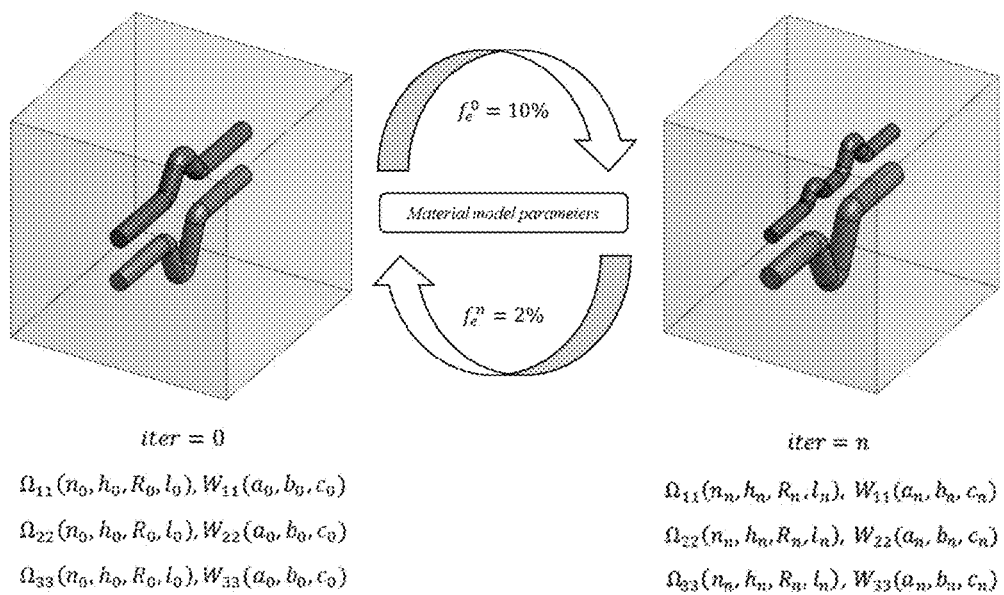
FIG. 13 depicts the optimization of the 3-dimensional model via adjustment of the selected bodies and structural templates.

As shown in FIGS. 11-13, the 3-dimensional model may require modifications to match the original object. If the results differ from the characteristics of the original object by more than a tolerance value, the 3-dimensional model is optimized to provide a more accurate representation of the human artery. The method then adjusts either the base materials, or the dimension of the bodies, to reduce the error. Although customization is allowed, the most efficient method consists of adjusting only the base materials. If the solutions available do not meet the error tolerance, the method adjusts the dimensions of the bodies.

Glossary of Claim Terms 3-dimensional model: is a virtual representation of an original object. The 3-dimensional model is utilized to generate a replica composite object based on the original object.

Additive manufacturing: is a process of creating a physical object based on instructions from a computer. An example of additive manufacturing is 3D printing.

Body: is a component of a replica composite object, wherein each body has a set of boundaries and a volume, with each body being tunable and contributing to the physical property or properties exhibited by the replica composite object.

Composite: as used herein, means that an individual subunit includes a plurality of bodies and/or base materials.

Discretization: is a process of subdividing a model into smaller units for evaluation.

Element: is a constituent part of a unit representing a particular set of equations. For example, an element may be an atomic particle.

Object: is a physical structure or one or more components parts of a physical structure.

Original object: is a physical object that forms the basis for a replica composite object generated via additive manufacturing. The original object may be an entire structure, including multiple component parts; an entire structure, including a single component part; or one or more individual component parts of a structure.

Physical property: is a characteristic of a material that indicates the material's behavior in response to a stimulus. Physical properties include mechanical properties, electrical properties, thermal properties, optical properties, and other similar properties; and include non-linear properties, such as elasticity.

Replica composite object: is a physical object (or part of an object) formed via additive manufacturing and designed to substantially replicate the structure or physical properties of an original object.

Simulation: is a mathematical method for calculating the physical response of a material. Example of simulation methods include finite element analysis and smooth particle hydrodynamics.

Subunit: is a component of a unit having a set of physical properties. Subunits within a unit may be grouped together to reflect a uniform set of physical properties.

Tolerance value: is a determined error threshold between two values. A process is repeated until the difference between two values is less than or equal to the tolerance value, indicating an acceptable error.

Unit: is a component of a physical object, such as a layer, section, or portion. For example, the adventitia layer of a human artery is considered a unit.

Glossary of Variables b, $b_h$: Bodies.
h: Counter used for number of bodies.
$n_b$: Number of bodies.
$\Omega$, $\Omega_i$: Volume (associated with each body)—space encompassed by a body.
$\Omega^\varphi$: Volume in the deformed configuration.
$\partial\Omega$: Surface (associated with each body).
$\partial\Omega^\varphi$: Surface in the deformed configuration.
i: Counter used for number of volumes.
$n_\Omega$: Number of volumes.
$\omega$, $\omega_i$: Volume function—Function that describes the volume of a body in a given coordinate system (Cartesian, cylindrical, spherical, etc.).
$\Gamma$, $\Gamma_j$: Boundary (associated to each interface between bodies, volumes)—Interface between bodies, volumes.
$\Gamma_j^\sigma$: Boundary where tractions are applied.
$\Gamma_j^u$: Boundary where the solution is prescribed.
$\Gamma_j^c$: Part of boundary that will be in contact with the other body.
X, $X_k^{(i)}$: Element (associated with each body, volume).
k: Counter used for number of elements.
$n_e$: Number of elements.
$X_j$: Coordinates of the nodes that define the geometry of a finite element
$N_l$, $N_l(\xi_1,\xi_2,\xi_3)$: Shape function of the elements.
$\xi$: Shape function coordinate system axes.
l: Counter used for number of nodes on each element.
$n_o$: Number of nodes.
$\delta W$: Virtual work.
$\sigma$: Second-order Cauchy stress tensor.
$\delta d$: Second-order virtual rate of deformation.
$\delta v$: Virtual velocity,
f: Body force.
t: Traction vector.
$\varphi$: Deformation mapping, also used as a superscript to denote deformation configuration.

REFERENCES

[1]: American Society for Testing and Materials, "Detailed Overview."
[2]: C. Geuzaine and J.-F. Remade, "Gmsh: a three-dimensional finite element mesh generator with built-in pre- and post-processing facilities," *International Journal for Numerical Methods in Engineering*, no. 0, pp. 1-24, 2009.
[3]: J. Schoberl, "NETGEN An advancing front 2D/3D-mesh generator based on abstract rules," *Computing and Visualization Science*, no. 1, pp. 41-52, 1997.
[4]: H. Si, "TetGen, a Delaunay-Based Quality Tetrahedral Mesh Generator," *ACM Transactions on Mathematical Software*, vol. 41, no. 2, 2015.
[5]: S. A. Maas, B. J. Ellis, G. A. Ateshian and J. A. Weiss, "FEBio: Finite Elements for Biomechanics," *Journal of Biomechanical Engineering*, vol. 134, January 2012.
[6]: B. Bickel, M. Bacher, M. A. Otaduy, R. Lee, H. Pfister, M. Gross and W. Matusik, "Design and Fabrication of Materials with Desired Deformation Behavior," *ACM Transactions on Graphics*, 2010.
[7]: Y. C. Fung, Biomechanics, Mechanical Properties of Living Tissues, New York: Springer, 1993.
[8]: T. C. Gasser, R. W. Ogden and G. A. Holzapfel, "Hyperelastic modelling of arterial layers with distributed collagen fibre orientation," *Journal of The Royal Society Interface*, no. 3, pp. 15-35, 2006.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

What is claimed is:

1. A method for the design and manufacture of a replica composite object based on an original object, the manufacture accomplished using additive manufacturing, the method comprising:
identifying one or more physical properties of an original object;
determining one or more physical properties of a plurality of base materials;
determining one or more physical properties of a plurality of bodies;
comparing the identified physical properties of the original object with the physical properties of the plurality of base materials and the physical properties of the plurality of bodies;

determining one or more desired physical properties of a replica composite object based on the identified one or more physical properties of the original object, the replica composite object including at least one unit;

dividing the at least one unit into a plurality of subunits, each subunit having tunable dimensions;

for each subunit, selecting at least one of the plurality of base materials and at least one of the plurality of bodies to match the one or more desired physical properties of the replica composite object with the identified one or more physical properties of the original object;

generating a 3-dimensional model of the replica composite object based on a structure of the original object, the replica composite object including the selected at least one of the plurality of base materials and at least one plurality of bodies for each subunit;

discretizing at least one of the plurality of subunits into a finite number of single or multidimensional elements, each element having one or more associated physical properties;

calculating the one or more associated physical properties for the at least one unit of the replica composite object wherein the one or more associated physical properties are based on the identified physical properties of the original object;

comparing the one or more associated physical properties for the at least one unit of the replica composite object with the identified physical properties of the original object;

if the respective physical properties of the replica composite object and the original object differ by more than a tolerance value, optimizing the one or more desired physical properties of the replica composite object by adjusting the physical properties of the at least one unit of the replica composite object, wherein the physical properties are based on at least one base material or a combination of one or more base materials and one or more bodies; and instructing an additive manufacturing system to generate the replica composite object having a combination of physical properties that substantially equates to the identified physical properties of the original object.

2. The method of claim 1, wherein the step of calculating the one or more associated physical properties for the at least one unit of the replica composite object further comprises:

performing a simulation to determine a physical response of the 3-dimensional model, the determined physical response being utilized to compare the 3-dimensional model to the original object, the simulation selected from the group consisting of finite element analysis and smooth particle hydrodynamics.

3. The method of claim 1, wherein:

during the step of dividing the at least one unit into a plurality of subunits, the number of the subunits is determined by a resolution of the additive manufacturing system, with a higher resolution yielding more subunits and thereby greater accuracy of the replica composite object.

4. The method of claim 1, wherein, after adjusting the physical properties of at least one unit of the replica object, the steps of calculating the one or more associated physical properties for at least one of the units of the replica composite object; and comparing the one or more associated physical properties for the at least one unit of the replica composite object with the identified physical properties of the original object, are repeated until the respective physical properties of the replica composite object and the original object differ by less than or equal to a tolerance value.

5. The method of claim 1, wherein each of the plurality of bodies further comprises a volume and is defined by a boundary, each of the plurality of bodies being independently tunable to substantially equate the physical properties of the 3-dimensional model with the physical properties of the original object.

6. The method of claim 1, wherein the optimization step further comprises:

selecting at least two of the plurality of base materials; and combining the selected at least two of the plurality of base materials via material blending, thereby fine-tuning the physical properties of the 3-dimensional model.

7. The method of claim 1, wherein the optimization step further comprises:

selecting at least one of the plurality of base materials and at least one of the plurality of bodies; and adjusting the at least one of the plurality of bodies, thereby adjusting the 3-dimensional model to substantially match the original object.

8. The method of claim 7, wherein the 3-dimensional model is adjusted by repeating the steps of generating the 3-dimensional model of the replica composite object, discretizing at least one of the plurality of subunits into the finite number of single or multidimensional elements, calculating the one or more associated physical properties for at least one unit of the replica composite object, and comparing the one or more associated physical properties for the at least one unit of the replica composite object with the identified physical properties of the original object.

9. The method of claim 1, wherein:

the one or more desired physical properties of the replica composite object are anisotropic.

10. A method for the design and manufacture of a replica composite object based on an original object, the manufacture accomplished using additive manufacturing, the method comprising:

providing a database including a plurality of base materials and bodies, each of the plurality of base materials and bodies including an associated at least one physical property;

identifying at least one physical property of an original object by subjecting the original object to a physical stimulus;

generating a 3-dimensional model of a replica composite object, the replica composite object being based on a structure of the original object, the replica composite object including at least one unit having at least one subunit, the at least one subunit including at least one physical property selected from the database, the at least one physical property selected from the group consisting of a base material and a combination of a base material and a body;

discretizing the at least one subunit into a finite number of single or multidimensional elements, each element having one or more associated physical properties;

calculating the at least one physical property of the at least one unit by subjecting the at least one unit to a virtual stimulus based on a physical stimulus;

comparing the at least one physical property of the at least one unit with the identified at least one physical property of the original object;

if the at least one physical property of at least one unit differs from the identified at least one physical property of the original object by a tolerance value, optimizing the 3-dimensional model by adjusting the at least one physical property of the at least one subunit; and instructing an additive manufacturing system to generate the replica composite object having at least one physical property that substantially equates to the identified at least one physical property of the original object.

11. The method of claim 10, wherein the step of calculating the at least one physical property of each unit further comprises:

performing a simulation to determine a physical response of the 3-dimensional model, the determined physical response being utilized to compare the 3-dimensional model to the original object, the simulation selected from the group consisting of finite element analysis and smooth particle hydrodynamics.

12. The method of claim 10, wherein:

the at least one unit is further divided into a plurality of subunits, each of the plurality of subunits in the at least one unit including an identical set of the selected at least one of the plurality of base materials and at least one of the plurality of bodies, wherein the number of the subunits is determined by a resolution of the additive manufacturing system, with a higher resolution yielding more subunits and thereby greater accuracy of the replica composite object.

13. The method of claim 10, wherein, after adjusting the at least one physical property of the at least one subunit, the steps of calculating the at least one physical property of the at least one unit, and of comparing the at least one physical property of the at least one unit with the identified at least one physical property of the original object, are repeated until the respective physical properties of the at least one unit and the original object differ by less than or equal to a tolerance value.

14. The method of claim 10, wherein each of the plurality of bodies encompasses a volume, defines a boundary, and is independently tunable to substantially equate the physical properties of the 3-dimensional model with the physical properties of the original object.

15. The method of claim 14, wherein the optimization step further comprises:

selecting at least one of the plurality of base materials and at least one of the plurality of bodies; and adjusting at least one of the volume and the boundary of at least one of the plurality of bodies, thereby adjusting the 3-dimensional model to substantially match the original object.

16. A method of optimizing a replica composite object manufactured via additive manufacturing, the method comprising:

identifying a structure of an original object;

identifying a physical property of the original object by subjecting the original object to a physical stimulus;

selecting a base material and a body from a database containing a plurality of base materials and bodies, each base material and each body having an associated physical property;

generating a 3-dimensional model of a replica composite object, the 3-dimensional model including:

a structure configured to substantially match the structure of the original object; and the selected base material and body, the base material and body selected to substantially match the identified physical property of the original object;

discretizing the 3-dimensional model into a finite number of single or multidimensional elements, wherein each element contains the same selected base material and body;

calculating a physical property of the selected base material and body by subjecting one or more of the single or multidimensional elements to a virtual stimulus based on the physical stimulus;

comparing the calculated physical property of the 3-dimensional model with the identified physical property of the original object;

optimizing the 3-dimensional model such that the calculated physical property of the replica composite object substantially matches the identified physical property of the original object;

wherein during the optimization step, at least one of the selected base material and the selected body is updated until the difference between the calculated physical property of the 3-dimensional model and the identified physical property of the original object is less than a tolerance value;

wherein if the selected body within the replica composite object is updated, the steps of generating a 3-dimensional model, discretizing the 3-dimensional model, calculating the physical property, and comparing the calculated physical property with the identified physical property are repeated; and wherein if the selected base material is updated, the steps of calculating the physical property, and comparing the calculated physical property with the identified physical property are repeated.

17. The method of claim 16, wherein the step of calculating a physical property of the selected base material and body further comprises:

performing a simulation to determine a physical response of the 3-dimensional model, the determined physical response being utilized to compare the 3-dimensional model to the original object, the simulation selected from the group consisting of finite element analysis and smooth particle hydrodynamics.

18. The method of claim 16, wherein each of the plurality of bodies encompasses a volume, defines a boundary, and is independently tunable to substantially equate the physical properties of the 3-dimensional model with the physical properties of the original object.

19. The method of claim 18, further comprising:

adjusting at least one of the volume and the boundary of at least one of the plurality of bodies, thereby adjusting the 3-dimensional model to substantially match the original object.

20. The method of claim 16, further comprising the step of instructing an additive manufacturing system to generate the replica composite object having a physical property that substantially equates to the identified physical property of the original object.

* * * * *